United States Patent
Ito et al.

(10) Patent No.: US 11,283,534 B2
(45) Date of Patent: Mar. 22, 2022

(54) INTERFERENCE POWER ESTIMATION METHOD, INTERFERENCE POWER ESTIMATION APPARATUS AND PROGRAM

(71) Applicant: NIPPON TELEGRAPH AND TELEPHONE CORPORATION, Tokyo (JP)

(72) Inventors: Kota Ito, Musashino (JP); Hideyuki Tsuboi, Musashino (JP); Yutaka Imaizumi, Musashino (JP); Yushi Shirato, Musashino (JP); Naoki Kita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 4 days.

(21) Appl. No.: 16/981,750

(22) PCT Filed: Mar. 7, 2019

(86) PCT No.: PCT/JP2019/009083
§ 371 (c)(1),
(2) Date: Sep. 17, 2020

(87) PCT Pub. No.: WO2019/181534
PCT Pub. Date: Sep. 26, 2019

(65) Prior Publication Data
US 2021/0126724 A1    Apr. 29, 2021

(30) Foreign Application Priority Data
Mar. 22, 2018    (JP) .............................. JP2018-055340

(51) Int. Cl.
*H04B 17/345* (2015.01)
*H04B 17/40* (2015.01)
*G01S 19/21* (2010.01)

(52) U.S. Cl.
CPC ........... *H04B 17/345* (2015.01); *H04B 17/40* (2015.01); *G01S 19/21* (2013.01)

(58) Field of Classification Search
CPC .... H04B 17/345; H04B 17/40; H04B 17/336; H04B 7/0469; H04B 15/00; H04B 17/27;
(Continued)

(56) References Cited

U.S. PATENT DOCUMENTS 5,937,350 A * 8/1999 Frank .................... H04W 84/02
455/433
5,970,408 A * 10/1999 Carlsson ............... H04W 36/36
455/11.1
(Continued)

FOREIGN PATENT DOCUMENTS

WO    WO-0036858 A2 * 6/2000 ............ H04W 36/24
WO    WO-2012113098 A1 * 8/2012 .......... H04J 11/0056

OTHER PUBLICATIONS

Ministry of Internal Affairs and Communications, "2012 Information and Communication Council Information and Communication Technology Subcommittee Mobile Phone Advancement Committee Report (Draft)", 2012, p. 85. Machine translation attached.

*Primary Examiner* — Lana N Le

(57) ABSTRACT

The interference power estimation apparatus 1 calculates an inter-station vector from an interfering station over a sphere to an interfered station installed in the sphere based on a position of each station. In a case where a line segment connecting the position of the interfered station and the position of the interfering station does not intersect with the sphere, an angle between an antenna direction vector representing a direction of an antenna from the position of the interfered station and the inter-station vector is derived, and a sum of an antenna directivity attenuation amount obtained based on the angle and propagation losses calculated based on a distance between the interfered station and the inter-
(Continued)

fering station is calculated. The interference power estimation apparatus 1 calculates the sum for each of a plurality of possible positions of the interfering station, but does not calculate the sum in a case where the line segment connecting the position of the interfered station and the position of the interfering station intersects with the sphere. The interference power estimation apparatus 1 calculates interference power from the interfering station, based on a minimum value of the calculated sum.

5 Claims, 13 Drawing Sheets

(58) Field of Classification Search
CPC .. H04B 17/318; H04B 7/086; H04B 7/18543; H04B 17/12; H04B 17/327; G01S 19/21; H04J 11/00; H04J 11/005; H04L 27/00; H04L 5/0073; H04W 64/00; H04W 64/006; H04W 4/025; H04W 4/029; H04W 28/0236; H04W 40/06; H04W 48/04; H04W 52/24; H04W 52/242; H04W 52/243
See application file for complete search history.

(56) References Cited

U.S. PATENT DOCUMENTS

| | | | | |
|---|---|---|---|---|
| 6,047,160 | A * | 4/2000 | Priest | H01Q 1/3216 455/11.1 |
| 6,345,186 | B1 * | 2/2002 | Schultz | H04W 36/24 455/436 |
| 8,725,185 | B2 * | 5/2014 | Ozaki | H04W 72/0426 455/509 |
| 9,504,057 | B2 * | 11/2016 | Ahmadi | H04W 72/1215 |
| 9,549,314 | B2 * | 1/2017 | Ode | H04W 72/048 |
| 10,690,776 | B2 * | 6/2020 | McMilin | G01S 19/36 |
| 2002/0097184 | A1 * | 7/2002 | Mayersak | G01S 19/18 342/458 |
| 2003/0003874 | A1 * | 1/2003 | Nitta | H04W 72/082 455/67.11 |
| 2004/0179484 | A1 * | 9/2004 | Nakazawa | H04B 17/345 370/278 |
| 2012/0050103 | A1 * | 3/2012 | Revol | G01S 19/37 342/357.68 |
| 2015/0341093 | A1 * | 11/2015 | Ji | H04B 7/0626 375/267 |
| 2017/0111131 | A1 * | 4/2017 | Hausleitner | H04K 3/22 |
| 2021/0099217 | A1 * | 4/2021 | Ota | H01Q 21/08 |

* cited by examiner

S505

WHEN (1) $\overrightarrow{BP_{H\perp}}$: VECTOR OBTAINED BY ROTATING ANTENNA DIRECTION $\overrightarrow{BP}$ IN HORIZONTAL DIRECTION BY $\frac{\pi}{2}$ (2) $\overrightarrow{BP_{V\perp}}$: VECTOR OBTAINED BY ROTATING ANTENNA DIRECTION $\overrightarrow{BP}$ IN VERTICAL DIRECTION BY $\frac{\pi}{2}$

ARE DEFINED, $$\overrightarrow{OP_{H\perp}} = \begin{pmatrix} \cos\phi_B & -\sin\phi_B & 0 \\ \sin\phi_B & \cos\phi_B & 0 \\ 0 & 0 & 1 \end{pmatrix} \begin{pmatrix} \cos(-\theta_B) & 0 & \sin(-\theta_B) \\ 0 & 1 & 0 \\ -\sin(-\theta_B) & 0 & \cos(-\theta_B) \end{pmatrix} \begin{pmatrix} \sin\phi\sin(\theta+\frac{\pi}{2})+R+h_B \\ \sin(\theta+\frac{\pi}{2}) \\ \cos\phi\sin(\theta+\frac{\pi}{2}) \end{pmatrix}$$

$$\overrightarrow{OP_{V\perp}} = \begin{pmatrix} \cos\phi_B & -\sin\phi_B & 0 \\ \sin\phi_B & \cos\phi_B & 0 \\ 0 & 0 & 1 \end{pmatrix} \begin{pmatrix} \cos(-\theta_B) & 0 & \sin(-\theta_B) \\ 0 & 1 & 0 \\ -\sin(-\theta_B) & 0 & \cos(-\theta_B) \end{pmatrix} \begin{pmatrix} \sin(\phi+\frac{\pi}{2})\sin\theta+R+h_B \\ \sin\theta \\ \cos(\phi+\frac{\pi}{2})\sin\theta \end{pmatrix}$$

ARE OBTAINED,

AND THUS
$$\overrightarrow{BP_{H\perp}} = \overrightarrow{OP_{H\perp}} - \overrightarrow{OB}$$
$$\overrightarrow{BP_{V\perp}} = \overrightarrow{OP_{V\perp}} - \overrightarrow{OB}$$

ARE DERIVED.

S510

WHEN (1) PLANE $T_H$: PLANAR INCLUDING VECTOR $\overrightarrow{BP}, \overrightarrow{BP_{H\perp}}$ (2) PLANAR $T_V$: PLANAR INCLUDING VECTOR $\overrightarrow{BP}, \overrightarrow{BP_{V\perp}}$ (3) POINT $A_{i,H}$: INTERSECTION POINT WHEN PERPENDICULAR IS DRAWN FROM POINT $A_i$ TO PLANE $T_H$ (4) POINT $A_{i,V}$: INTERSECTION POINT WHEN PERPENDICULAR IS DRAWN FROM POINTS $A_i$ TO PLANE $T_V$

ARE DEFINED, $$\overrightarrow{BA_{i,H}} = \overrightarrow{BA_i} - (\overrightarrow{BA_i} \cdot \overrightarrow{BP_{V\perp}})\overrightarrow{BP_{V\perp}}$$
$$\overrightarrow{BA_{i,V}} = \overrightarrow{BA_i} - (\overrightarrow{BA_i} \cdot \overrightarrow{BP_{H\perp}})\overrightarrow{BP_{H\perp}}$$

ARE DERIVED

Fig. 6

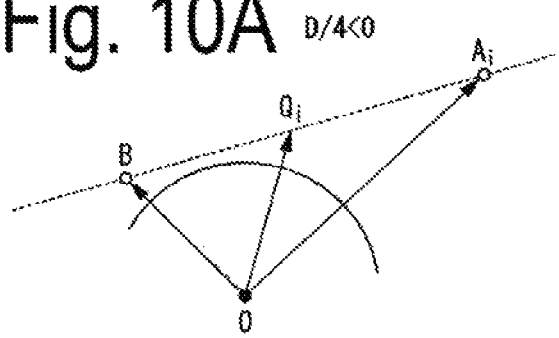
Fig. 10A D/4<0
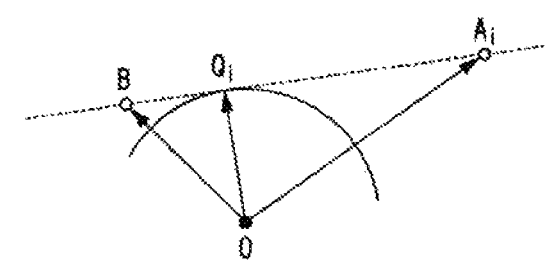
Fig. 10B D/4=0
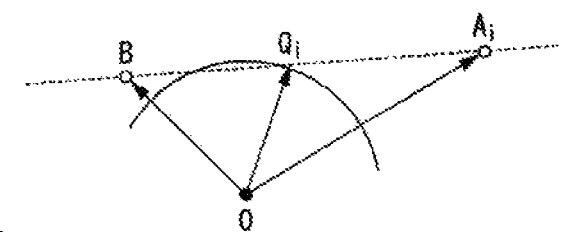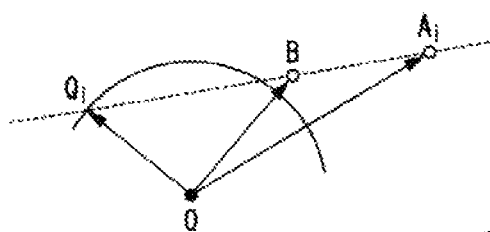
Fig. 10C D/4>0

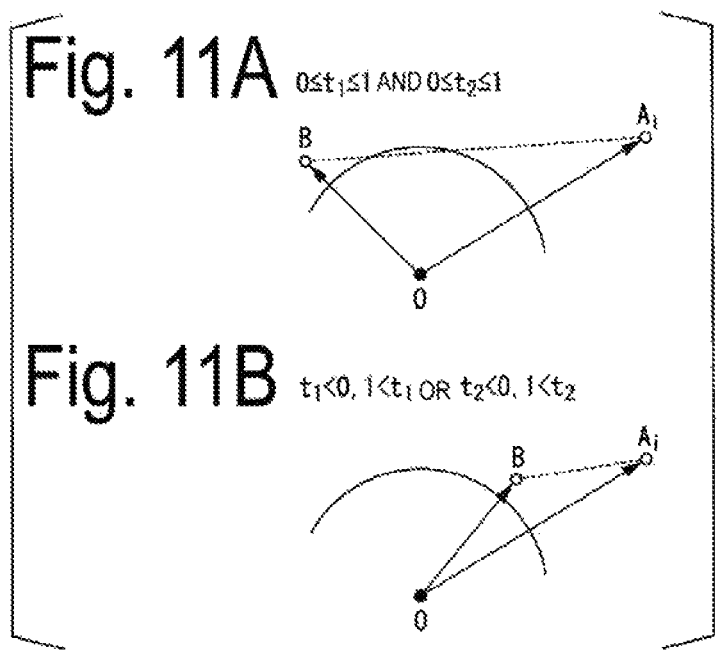
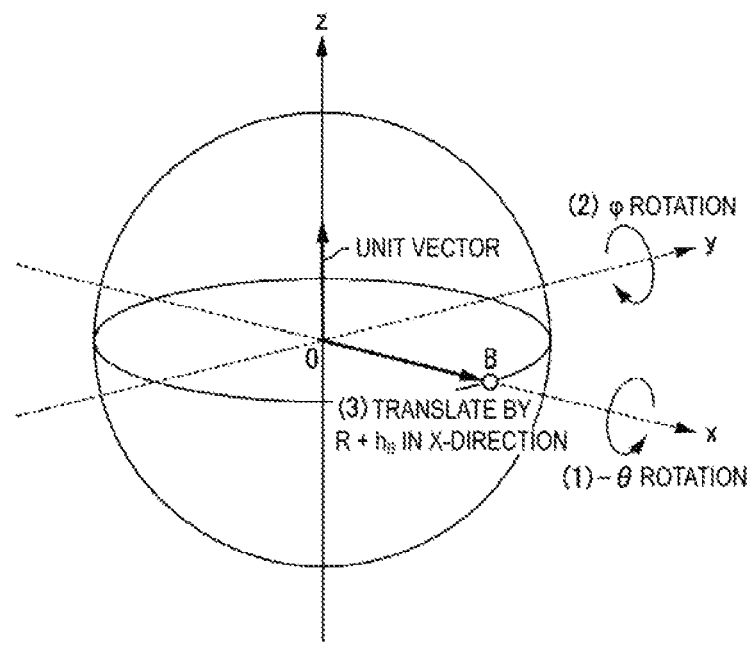
Fig. 12

INTERFERENCE POWER ESTIMATION METHOD, INTERFERENCE POWER ESTIMATION APPARATUS AND PROGRAM

CROSS-REFERENCE TO RELATED APPLICATIONS

This application is a 371 U.S. National Phase of International Application No. PCT/JP2019/009083, filed on Mar. 7, 2019, which claims priority to Japanese Application No. 2018-055340 filed on Mar. 22, 2018. The entire disclosures of the above applications are incorporated herein by reference.

TECHNICAL FIELD

The present disclosure relates to an interference power estimation method, an interference power estimation apparatus, and a program.

BACKGROUND ART

Artificial satellites are actively used for a variety of purposes, including observation of the Earth, searching for planets, electrical communication, Global Positioning Systems (GPS), and military. With this, interference between the satellite and another wireless system needs to be considered, and interference coordination has been increasing between operators.

In the interference coordination, by comparing incoming interference power from an interfering station with allowable interference power of an interfered station, it is determined whether to permit interference. In particular, in interference coordination in a case where a satellite is operating normally, a technology such as calculating incoming interference power based on a limit value of a ground surface power flux density (PFD) defined in article 21 of ITU wireless communication regulations (see, for example, Non-Patent Literature 1) is used.

CITATION LIST

Non Patent Literature

Non-Patent Literature 1: "2012 Information and Communication Council Information and Communication Technology Subcommittee Report on Advanced Committee on Mobile Phones (Draft) (平成 2 4 年度 情報通信審議会 情報通信 技術分科会 携帯電話等高度化委員会報告 (案))", Ministry of Internal Affairs and Communications, 2012, p. 85

SUMMARY OF THE INVENTION

Technical Problem

For the interference coordination, it is necessary to calculate the incoming interference power from the interfering station and compare the incoming interference power with the allowable interference power of the interfered station. In interference coordination in a case where a satellite is operating normally, as described in Non-Patent Literature 1, a technology such as calculating incoming interference power based on a limit value of a ground surface power flux density (PFD) defined in article 21 of ITU wireless communication regulations is used.

Meanwhile, the technology of Non-Patent Literature 1 may not be applicable in a case where the satellite is in an abnormal state. A satellite located remotely from the Earth needs to emit radio waves at a high gain antenna and high transmission power to transmit information to the Earth. In a case where such a satellite becomes an abnormal state and a normal operation cannot be performed, radio waves may be radiated at high gain antennas and high transmission power despite being near the Earth, and there is a possibility that interference incoming power from the satellite may exceed the limit value of the ground surface power flux density (PFD). Thus, another technology, separate from a case where the satellite is in a normal state, for calculating interference incoming power is required.

In view of the above problem, an object of the present disclosure is to provide an interference power estimation method, an interference power estimation apparatus, and a program capable of more accurately and easily calculating interference power from a satellite to a ground station.

Means for Solving the Problem

According to one aspect of the present disclosure, there is provided an interference power estimation method including: calculating an inter-station vector which is a vector from an interfered station to an interfering station, based on interfering station position information representing a position of the interfering station over a sphere and interfered station position information representing a position of the interfered station installed on the sphere; determining whether a line segment connecting the position of the interfered station and the position of the interfering station intersects with the sphere; calculating, in accordance with a determination of the determining that there is no intersection, an antenna direction vector which is a vector representing a direction of an antenna from the position of the interfered station, based on antenna direction information representing the direction of the antenna of the interfered station and the interfered station position information; deriving an angle between the antenna direction vector and the inter-station vector; calculating a sum of an antenna directivity attenuation amount obtained based on the angle and propagation losses calculated based on a distance between the interfered station and the interfering station; controlling to perform the calculating of the inter-station vector, the determining, the calculating of the antenna direction vector, and the calculating of the sum on each piece of information of a plurality of possible positions of the interfering station, and not to perform, in accordance with a determination of the determining that the line segment corresponding to the position of the interfering station intersects, the calculating of the antenna direction vector and the calculating of the sum on the position of the interfering station; calculating a minimum value of the sum calculated for each piece of the information of the plurality of possible positions of the interfering station; and calculating interference power from the interfering station based on the minimum value of the sum.

In the interference power estimation method according to the aspect of the present disclosure, the deriving of the angle includes, in a case where antenna directivity of the interfered station differs between a horizontal direction and a vertical direction, decomposing the inter-station vector into a horizontal component and a vertical component, and an antenna directivity attenuation amount obtained based on an angle between the horizontal component and the antenna direction vector and summing an antenna directivity attenuation amount obtained based on an angle between the vertical component and the antenna direction vector, and the calculating of the sum of the antenna directivity attenuation amount and the propagation losses, includes calculating a sum of the total antenna directivity attenuation amount and the propagation losses.

In the interference power estimation method according to the aspect of the present disclosure, the calculating of the antenna direction vector includes setting, a virtual position of the interfered station to a position at which latitude and longitude are 0° out of latitude, longitude, and altitude indicated by the interfered station position information, and calculating the antenna direction vector by using a matrix operation which includes rotating a unit vector which has a starting point at a center of the sphere and which is perpendicular to a direction from the center to the virtual position in accordance with an antenna azimuth and an antenna elevation angle obtained from the antenna direction information, and then translating the unit vector rotated from the center to the virtual position, and further includes rotating the unit vector rotated and then translated in accordance with the latitude and the longitude indicated by the interfered station position information.

According to another aspect of the present disclosure, there is provided an interference power estimation apparatus including: an inter-station vector calculation unit configured to calculate an inter-station vector which is a vector from an interfered station to an interfering station, based on interfering station position information representing a position of the interfering station over a sphere and interfered station position information representing a position of the interfered station installed on the sphere; a determination unit configured to determine whether a line segment connecting the position of the interfered station and the position of the interfering station intersects with the sphere; an antenna direction vector calculation unit configured to calculate, in accordance with a determination of the determination unit that there is no intersection, an antenna direction vector which is a vector representing a direction of an antenna from the position of the interfered station, based on antenna direction information representing the direction of the antenna of the interfered station and the interfered station position information; an angle deriving unit configured to derive an angle between the antenna direction vector and the inter-station vector; a sum calculation unit configured to calculate a sum of an antenna directivity attenuation amount obtained based on the angle derived by the angle deriving unit and propagation losses calculated based on a distance between the interfered station and the interfering station; a process control unit configured to control to perform processes of the inter-station vector calculation unit, the determination unit, the antenna direction vector calculation unit, and the sum calculation unit, on each piece of information of a plurality of possible positions of the interfering station, and not to perform, in accordance with a determination of the determination unit that the line segment corresponding to the position of the interfering station intersects, processes of the antenna direction vector calculation unit and the sum calculation unit on the position of the interfering station; a minimum value calculation unit configured to calculate a minimum value of the sum calculated for each piece of the information of the plurality of possible positions of the interfering station; and an interference power calculation unit configured to calculate interference power from the interfering station based on the minimum value of the sum.

According to still another aspect of the present disclosure, there is provided a program causing a computer to function as: the interference power estimation apparatus described above.

Effects of the Invention

According to the present disclosure, it is possible to more accurately and easily calculate an interference power from a satellite to a ground station.

BRIEF DESCRIPTION OF DRAWINGS

FIG. 6 is a diagram illustrating still another detailed flow of the interference power estimation process executed by the interference power estimation apparatus according to the same embodiment.

FIGS. 10A to 10C are diagrams illustrating a value of a discriminant D/4, a positional relationship between the interfering station Ai, the interfered station B, and an Earth's surface according to the same embodiment.

FIGS. 11A and 11B are diagrams illustrating values of solutions t1 and t2 of a quadratic formula, and a positional relationship between the interfering station Ai, the interfered station B, and the Earth's surface according to the same embodiment.

FIG. 12 is a diagram illustrating a derivation method of an antenna direction vector when a position of the interfered station B is at latitude 0° and longitude 0° according to the same embodiment.

DESCRIPTION OF EMBODIMENTS

Hereinafter, embodiments of the present invention will be described in detail with reference to drawings. In the following, a character string (for example, X) with "→" at the top to represent a vector is described as "(X)→".

In a case of an orbiting satellite or a satellite which does not remain in a specific position in an abnormal state, for accurate interference coordination, it is necessary to calculate incoming interference power from the satellite for each position at which the satellite exists and compare the maximum incoming interference power with allowable interference power of an interfered station. That the incoming interference power is maximum can refer to that the attenuation amount of radio waves is minimal. Two types of the attenuation of radio waves are propagation losses based on a propagation distance and directivity attenuation based on antenna directivity. That is, for all positions at which satellites may exist, it is necessary to consider two of the propagation losses and the directivity attenuation of radio waves emitted from the satellite, and to derive a case where the attenuation amount as a sum of both is minimum. An interference power estimation apparatus of the present embodiment calculates the attenuation amount (loss) of radio waves based on both of propagation losses and directivity attenuation for all positions at which satellites may exist, and calculates the maximum incoming interference power from the satellite based on the calculated minimum attenuation amount.

Figure 1:
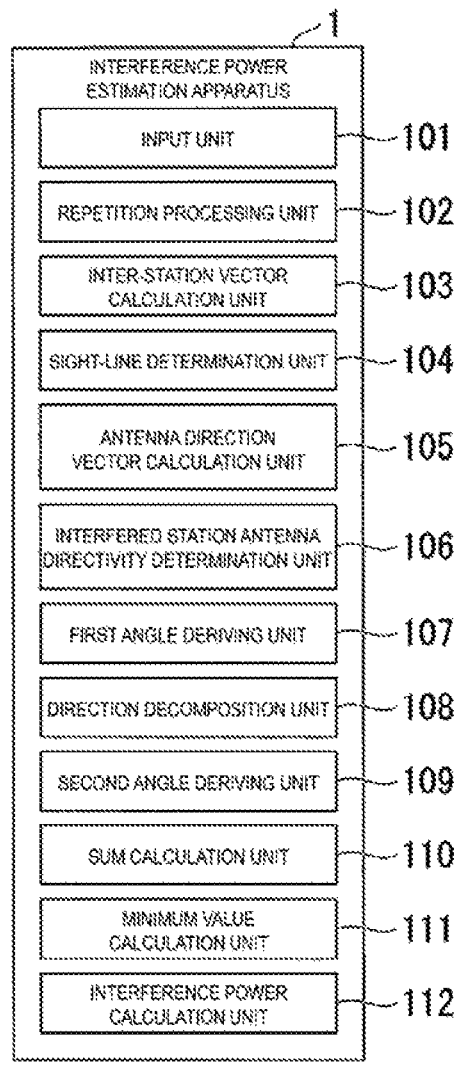
FIG. 1 is a functional block diagram of an interference power estimation apparatus according to an embodiment of the present disclosure.

FIG. 1 is a functional block diagram illustrating a configuration of an interference power estimation apparatus 1 according to an embodiment of the present disclosure, and only functional blocks related to the present embodiment are extracted and illustrated. The interference power estimation apparatus 1 illustrated in the same drawing includes an input unit 101, a repetition processing unit 102, an inter-station vector calculation unit 103, a sight-line determination unit 104, an antenna direction vector calculation unit 105, an interfered station antenna directivity determination unit 106, a first angle deriving unit 107, a direction decomposition unit 108, a second angle deriving unit 109, a sum calculation unit 110, a minimum value calculation unit 111, and an interference power calculation unit 112.

The input unit 101 inputs, by a user operation, information on a satellite which is an interfering station and a ground station which is an interfered station. The input information is positions at which the satellite and the ground station may exist, a loss of antenna gain and power, satellite transmission power (or transmission power density), an antenna direction of the ground station, antenna directivity patterns, or the like. The information on the position at which the satellite may exist may be information representing the position itself at which the satellite may exist, or information used to calculate the position at which the satellite may exist.

Based on the information input by the input unit 101, the repetition processing unit 102 obtains information on n positions at which satellites may exist. The position of the satellite is represented by a combination of longitude, altitude, and altitude. The repetition processing unit 102 controls other functions for performing an attenuation amount calculation process on each of satellite at each position. The attenuation amount calculation process is a process in which a sum of the attenuation amounts obtained by summing propagation losses and a directivity attenuation amount is calculated. When the repetition processing unit 102 repeats the attenuation amount calculation process and terminates calculation of a sum of the attenuation amounts for each of the satellites at all positions, the repetition processing unit 102 notifies the minimum value calculation unit 111 of an end of the repetition.

The inter-station vector calculation unit 103 derives an inter-station vector. The inter-station vector is a vector from the ground station (the interfered station) toward the satellite (the interfering station). The sight-line determination unit 104 determines whether a line segment connecting the ground station and the satellite has an intersection point with an Earth's surface. The sight-line determination unit 104 determines that there is no sight-line in accordance with a determination that there is no intersection point, and determines that there is a sight-line in accordance with a determination that there is the intersection point. The antenna direction vector calculation unit 105 derives, in accordance with a determination of the sight-line determination unit 104 that there is the sight-line an antenna direction vector. The antenna direction vector is a vector representing an antenna direction of the ground station in an identical coordinate system as position vectors of the satellite and the ground station.

The interfered station antenna directivity determination unit 106 refers to the antenna directivity pattern of the ground station, and determines whether an antenna directivity of the ground station differs between H (horizontal) and V (vertical) polarizations. In accordance with a determination that the antenna directivities of the ground station are identical in the H and V polarizations, the first angle deriving unit 107 calculates an angle between the inter-station vector from the ground station to the satellite and the antenna direction vector of the ground station. The first angle deriving unit 107 calculates the directivity attenuation amount based on the calculated angle and the antenna directivity pattern of the ground station. In a case where the antenna directivities of the ground station are different between the H and V polarizations, the direction decomposition unit 108 decomposes the inter-station vector from the ground station to the satellite, into an H component and a V component. The second angle deriving unit 109 derives an angle between each of the H component and the V component of the inter-station vector and the antenna direction vector of the ground station. The second angle deriving unit 109 calculates a directivity attenuation amount based on each of the calculated angles and the antenna directivity pattern of the ground station.

The sum calculation unit 110 calculates a distance between the ground station and the satellite, and calculates propagation losses based on the distance. The sum calculation unit 110 adds the directivity attenuation amount calculated by the interfered station antenna directivity determination unit 106 or the second angle deriving unit 109 to the propagation losses, and calculates a sum of the attenuation amounts. The minimum value calculation unit 111 calculates a minimum value of the sum of the calculated attenuation amounts for each of positions at which satellites may exist. The interference power calculation unit 112 calculates the maximum incoming interference power from the satellite to the ground station by using the minimum sum of the attenuation amounts calculated by the minimum value calculation unit 111.

Figure 2:
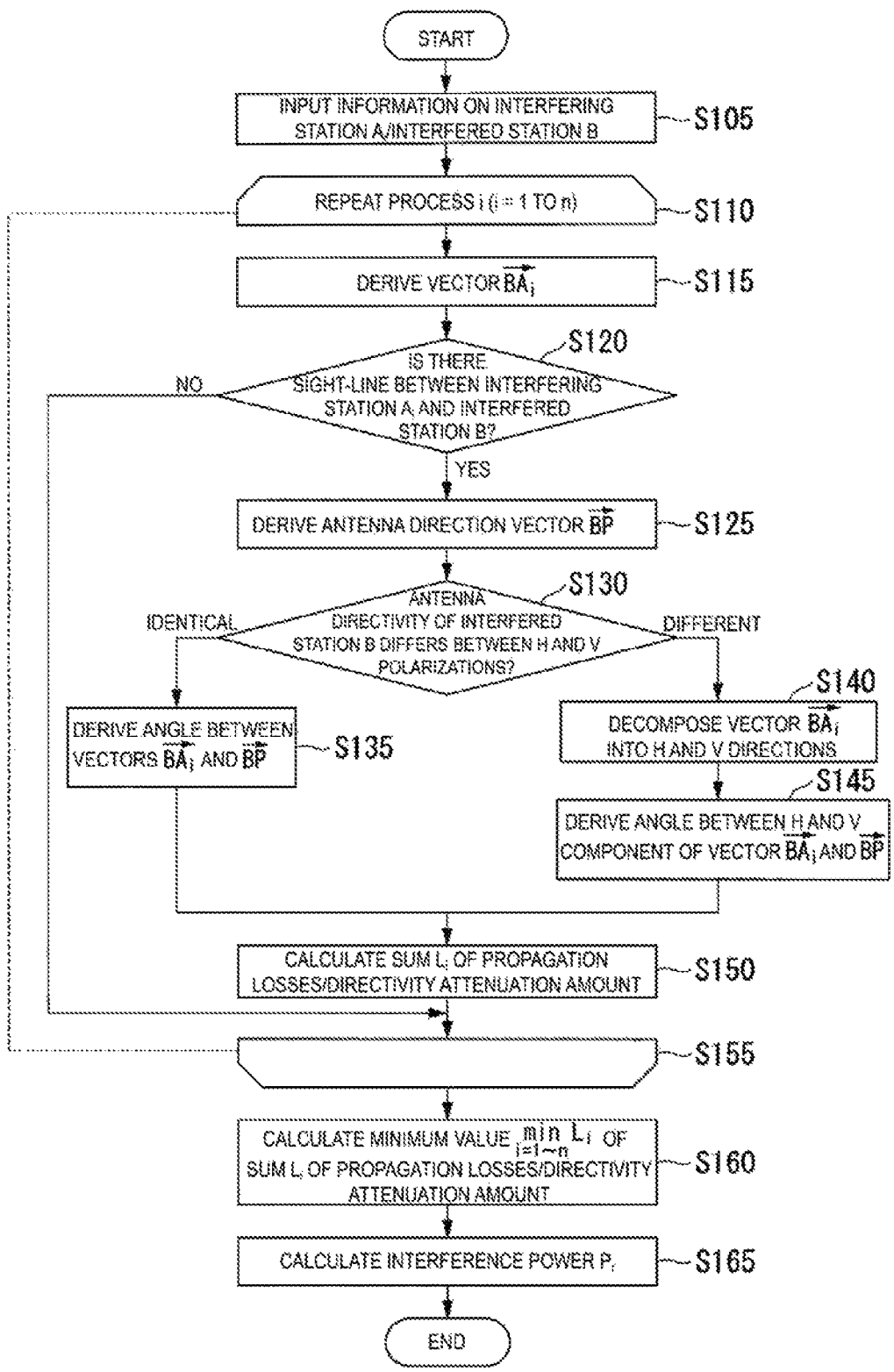
FIG. 2 is a diagram illustrating a simplified flow of an interference power estimation process executed by the interference power estimation apparatus according to the same embodiment.

FIG. 2 is a diagram illustrating a simplified flow of an interference power estimation process executed by the interference power estimation apparatus 1. Hereinafter, a satellite is described as an interfering station Ai and a ground station as an interfered station B. The interfering station Ai is an interfering station at a position i (i=1 to n).

The input unit 101 inputs information of the interfering station Ai and the interfered station B (step S105). The repetition processing unit 102 obtains all positions i (i=1 to n) at which interfering stations may exist. The position i includes a position at which a satellite, which is an interfering station, may exist when the satellite moves over a satellite orbit. The position i is represented by a combination of latitude, longitude, and altitude. The repetition processing unit 102 controls the attenuation amount calculation process in step S115 to step S150 to be repeatedly executed, for each of the positions i (i=1 to n) (step S110).

The inter-station vector calculation unit 103 derives a position vector of the interfering station Ai and a position vector of the interfered station B, and derives, using these position vectors, an inter-station vector (BAi)→ from the interfered station B toward the interfering station Ai (step S115). The sight-line determination unit 104 determines whether there is a sight-line between the interfering station Ai and the interfered station B based on whether a line segment connecting the interfered station B and the interfering station Ai has an intersection point with the Earth's surface (step S120).

In a case where the line segment connecting the interfered station B and the interfering station Ai has the intersection point with the Earth's surface, the sight-line determination unit 104 determines that there is no sight-line (NO in step S120). The repetition processing unit 102 controls the process from step S115 to be repeatedly executed, for the next i without performing the processes in step S125 to step S150. On the other hand, in a case where the line segment connecting the interfered station B and the interfering station Ai does not have the intersection point with the Earth's surface, the sight-line determination unit 104 determines that there is a sight-line (YES in step S120). The sight-line determination unit 104 passes the process to the antenna direction vector calculation unit 105 for interference calculation.

The antenna direction vector calculation unit 105 derives an antenna direction vector (BP)→ representing an antenna direction of the interfered station B in an identical coordinate system as position vectors of the interfering station Ai and the interfered station B (step S125). Next, the interfered station antenna directivity determination unit 106 determines whether antenna directivities of the interfered station B differs between H and V polarizations based on the antenna directivity pattern of the interfered station B input at step S105 (step S130).

In accordance with a determination that the antenna directivities of the ground station are identical in the H and V polarizations (identical in step S130), the interfered station antenna directivity determination unit 106 passes the process to the first angle deriving unit 107. The first angle deriving unit 107 calculates an angle between the inter-station vector (BAi)→ from the interfered station B toward the interfering station Ai and the antenna direction vector (BP)→ of the interfered station B (step S135). The first angle deriving unit 107 obtains the calculated directivity attenuation amount at the angle from the antenna directivity pattern of the interfered station B.

In accordance with a determination that the antenna directivities of the interfered station B are different in the H and V polarizations (different in step S130), the interfered station antenna directivity determination unit 106 passes the process to the direction decomposition unit 108. The direction decomposition unit 108 decomposes the inter-station vector (BAi)→ from the interfered station B toward the interfering station Ai into the H component and the V component (step S140). The second angle deriving unit 109 derives an angle formed between each of the H component and the V component of the inter-station vector (BAi)→ and the antenna direction vector (BP)→ of the interfered station B (step S145). When obtaining the directivity attenuation amount at the angle calculated for each of the H component and the V component from the antenna directivity pattern of the interfered station B, the second angle deriving unit 109 adds the directivity attenuation amounts to calculate a total directivity attenuation amount.

The sum calculation unit 110 calculates a distance between the interfering station Ai and the interfered station B by using the inter-station vector (BAi)→ from the interfered station B toward the interfering station Ai, and calculates propagation losses based on the distance. The sum calculation unit 110 sums the calculated propagation losses and the calculated directivity attenuation amount calculated in step S135 or the total directivity attenuation amount calculated in step S145, and calculates a sum Li of the attenuated amounts (step S150).

In accordance with a determination that the attenuation amount calculation process in step S115 to step S150 is completed for all of the interfering stations Ai (step S155), the repetition processing unit 102 notifies the minimum value calculation unit 111 of the end of the attenuation amount calculation process. The minimum value calculation unit 111 calculates a minimum value of the calculated sums Li of the attenuation amounts for each of the interfering stations Ai of i=1 to n (step S160). The interference power calculation unit 112 calculates an interference power Pr based on the minimum sum Li of the attenuation amounts calculated by the repetition processing unit 102 (step S165).

Next, detailed processes of the interference power estimation apparatus 1 will be described.

FIG. 3 to FIG. 8 are diagrams illustrating a detailed flow of the interference power estimation process illustrated in FIG. 2. Step S105 in FIG. 2 corresponds to step S205 to step S210 in FIG. 3, step S110 in FIG. 2 corresponds to step S215 in FIG. 3, and step S115 in FIG. 2 corresponds to step S220 in FIG. 3. Further, step S120 in FIG. 2 corresponds to step S305 to step S315 in FIG. 4. Step S125 in FIG. 2 corresponds to step S405 in FIG. 5, step S130 in FIG. 2 corresponds to step S410 in FIG. 5, and step S135 in FIG. 2 corresponds to step S415 in FIG. 5. Step S140 in FIG. 2 corresponds to step S505 to step S510 in FIG. 6, and step S145 in FIG. 2 corresponds to step S605 to S610 in FIG. 7. Step S150 in FIG. 2 corresponds to step S705 to step S710 in FIG. 8, step S155 in FIG. 2 corresponds to step S5715 in FIG. 8, step S160 in FIG. 2 corresponds to step S720 in FIG. 8, and step S165 in FIG. 2 corresponds to step S725 in FIG. 8.

Figure 3:
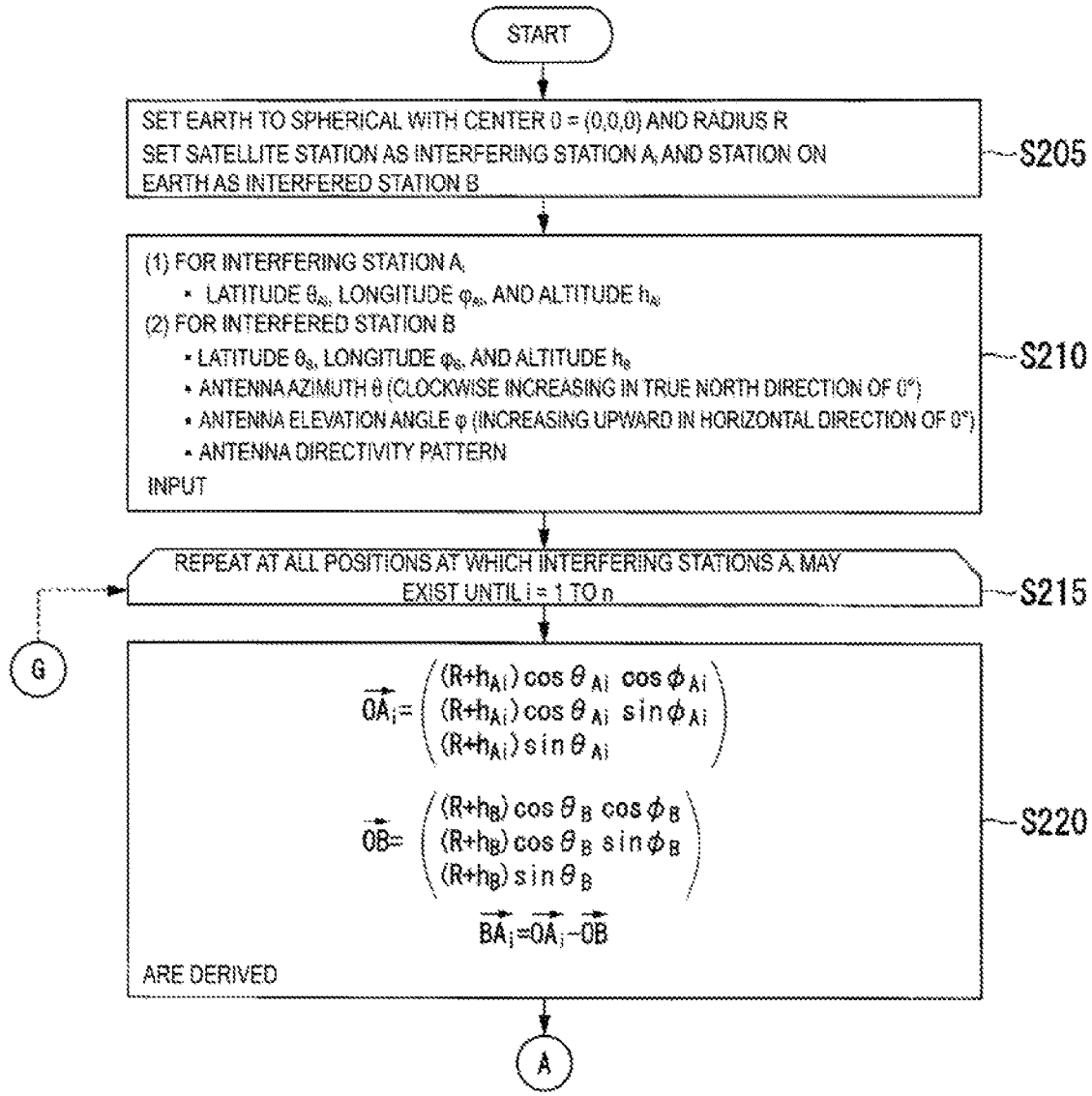
FIG. 3 is a diagram illustrating a detailed flow of the interference power estimation process executed by the interference power estimation apparatus according to the same embodiment.

First, in FIG. 3, the interference power estimation apparatus 1 sets the Earth as a sphere with a center O=(0, 0, 0) and a radius R. Further, the interference power estimation apparatus 1 sets a satellite station as the interfering station Ai (i is an integer equal to or more than 1) and a station on the Earth as the interfered station B (step S205). The input unit 101 inputs information of the interfering station Ai and the interfered station B (step S210). The input information is interfering station position information indicating latitude θAi, longitude φAi, and altitude hAi at which the interfering station Ai may exist, interfered station position information indicating latitude θB, longitude φB, and altitude hB of the interfered station B, antenna direction information indicating an antenna azimuth θ (clockwise increasing in a true north direction of 0°) and an antenna elevation angle φ (increasing upward in a horizontal direction of 0°) of the interfered station B, an antenna directivity pattern of the interfered station B, or the like, for example.

Figure 9:
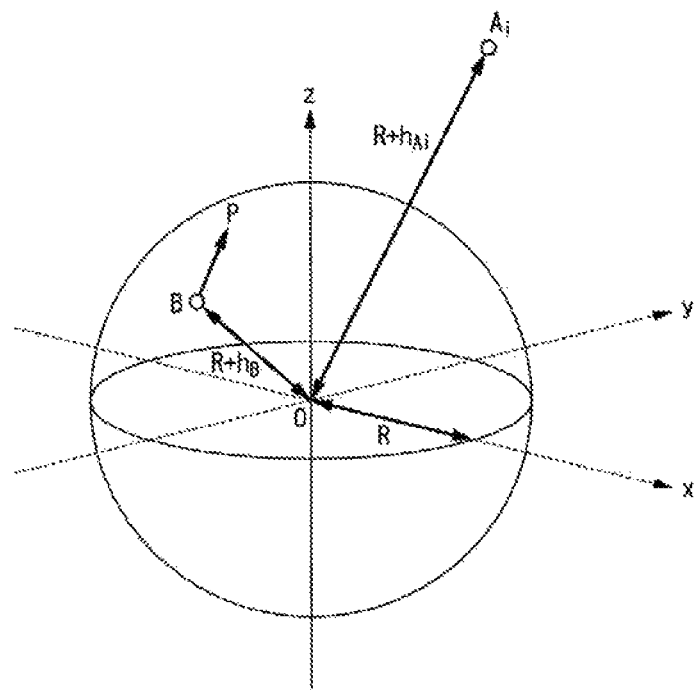
FIG. 9 is a diagram illustrating a positional relationship between an interfering station Ai and an interfered station B according to the same embodiment.

FIG. 9 is a diagram illustrating a positional relationship between the interfering station Ai and the interfered station B. A distance from the center O of the Earth to the interfering station Ai is the radius R of the Earth+the altitude hAi of the interfering station Ai, and a distance from the center O of the Earth to the interfered station B is the radius R of the Earth+the altitude hB of the interfered station B. The antenna direction vector (BP)→ is a unit vector representing an antenna direction of the interfered station B.

A range within which the interfering station Ai may exist as described above can be defined as desired, so that orbits of satellites which do not have a fixed orbit can also be considered in addition to a satellite having the fixed orbit such as a geostationary satellite or an orbiting satellite.

Figure 8:
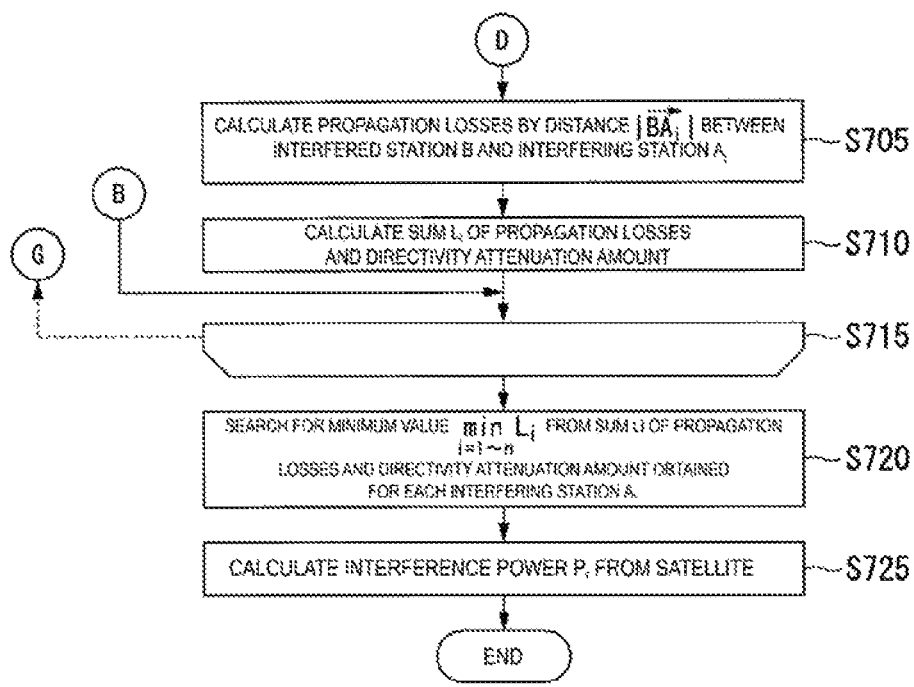
FIG. 8 is a diagram illustrating still another detailed flow of the interference power estimation process executed by the interference power estimation apparatus according to the same embodiment.

In FIG. 3, the repetition processing unit 102 repeats the attenuation amount calculation process from step S220 in FIG. 3 to step S710 in FIG. 8 while increasing a variable i by one from 1 to n to calculate the sum Li of the attenuation amounts for all n sets of the latitude θAi, the longitude φAi, and the altitude hAi representing the position i of the interfering station Ai (i=1 to n) (step S215).

According to formulas (1) and (2), the inter-station vector calculation unit 103 obtains each of a vector (OAi)→ representing a position of the interfering station Ai and a vector (OB)→ representing a position of the interfered station B when the interfering station Ai and the interfered station B are in xyz space on the assumption that the Earth is a sphere having the center O=(0,0,0) and the radius R.

[Formula 1]

$$\overrightarrow{OA_i} = \begin{pmatrix} (R+h_{Ai})\cos\theta_{Ai}\cos\varphi_{Ai} \\ (R+h_{Ai})\cos\theta_{Ai}\sin\varphi_{Ai} \\ (R+h_{Ai})\sin\theta_{Ai} \end{pmatrix} \quad (1)$$

[Formula 2]

$$\overrightarrow{OB} = \begin{pmatrix} (R+h_B)\cos\theta_B\cos\varphi_B \\ (R+h_B)\cos\theta_B\sin\varphi_B \\ (R+h_B)\sin\theta_B \end{pmatrix} \quad (2)$$

The inter-station vector calculation unit 103 calculates the inter-station vector (BAi)→ from the interfered station B toward the interfering station Ai by formula (3), by using the vector (OAi)→ and the vector (OB)→ obtained above (step S220).

[Formula 3]

$$\overrightarrow{BA_i} = \overrightarrow{OA_i} - \overrightarrow{OB} \quad (3)$$

Next, the sight-line determination unit 104 determines whether the Earth is between the interfering station Ai and the interfered station B, that is, whether there is a sight-line from the interfered station B to the interfering station Ai.

Specifically, the sight-line determination unit 104 determines whether a line segment AiB and the Earth's surface have an intersection point by using a discriminant. Assuming that a point on the line segment AiB is Qi, a vector (OQi)→ from the center O of the Earth to the point Qi is represented by the following formula (4).

[Formula 4]

$$\overrightarrow{OQ_i} = t\overrightarrow{OA_i} + (1-t)\overrightarrow{OB} \text{ (where } 0 \leq t \leq 1) \quad (4)$$

The formula (4) is organized with t to obtain the following formula (5).

[Formula 5]

$$|\overrightarrow{BA_i}|^2 t^2 + 2\overrightarrow{BA_i} \cdot \overrightarrow{OB} t + |\overrightarrow{OB}|^2 - |\overrightarrow{OQ_i}|^2 = 0 \quad (5)$$

When the point Qi exists on the Earth's surface, that is, when a distance from the center O of the Earth to the point Qi is |(OQi)→|=R equal to the radius R of the Earth, there is a possibility that the Earth exists on the AiB and there is no sight-line. Thus, a discriminant D/4 of formula (7) is considered for the quadratic formula indicated in the following formula (6):

[Formula 6]

$$|\overrightarrow{BA_i}|^2 t^2 + 2\overrightarrow{BA_i} \cdot \overrightarrow{OB} t + |\overrightarrow{OB}|^2 - R^2 = 0 \quad (6)$$

[Formula 7]

$$D/4 = (\overrightarrow{BA_i} \cdot \overrightarrow{OB})^2 - |\overrightarrow{BA_i}|^2 (|\overrightarrow{OB}|^2 - R^2) \quad (7)$$

FIGS. 10A to 10C are diagrams illustrating a value of the discriminant D/4, a positional relationship between the interfering station Ai, the interfered station B, and an Earth's surface. As illustrated in FIG. 10A, when the discriminant D/4<0, the straight line AiB passing through the interfering station Ai and the interfered station B does not have an intersection point with the Earth's surface. As illustrated in FIG. 10B, when the discriminant D/4=0, the straight line AiB passing through the interfering station Ai and the interfered station B in contact with the Earth's surface. As illustrated in FIG. 10C, when the discriminant D/4>0, the straight line AiB passing through the interfering station Ai and the interfered station B has intersection points with the Earth's surface.

Figure 4:
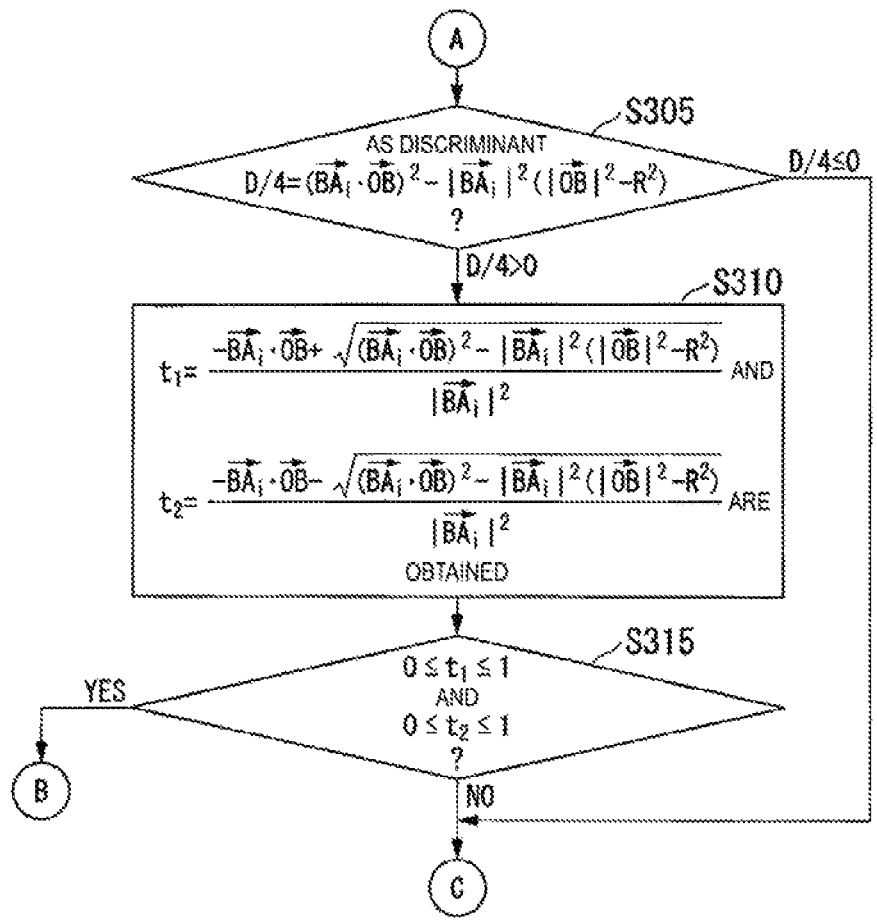
FIG. 4 is a diagram illustrating another detailed flow of the interference power estimation process executed by the interference power estimation apparatus according to the same embodiment.

Thus, in FIG. 4, the sight-line determination unit 104 determines a value of the determination D/4 calculated by formula (7) (step S305). As illustrated in FIGS. 10A and 10B, when D/4<0, the straight line AiB and the Earth's surface do not have the intersection point or come into contact with each other. In a case of D/4≤0 (D/4≤0 in step S305), the sight-line determination unit 104 determines that there is a sight-line on the AiB, and the interference power estimation apparatus 1 performs the processes in FIG. 5 to be described below.

On the other hand, as illustrated in FIG. 10C, when D/4>0, the straight line AiB and the Earth's surface have the intersection points, but it is not possible to determine whether the line segment AiB and the Earth's surface have an intersection point. Thus, in a case where D/4>0 (D/4>0 in step S305), the sight-line determination unit 104 actually resolves the quadratic formula of formula (6) to obtain a solutions t1 and a solution t2 (step S310). The solution t1 and the solution t2 are calculated according to the following formula (8).

[Formula 8]

$$t_1 = \frac{-\vec{BA_i} \cdot \vec{OB} + \sqrt{(\vec{BA_i} \cdot \vec{OB})^2 - |\vec{BA_i}|^2(|\vec{OB}|^2 - R^2)}}{|\vec{BA_i}|^2},$$

$$t_2 = \frac{-\vec{BA_i} \cdot \vec{OB} + \sqrt{(\vec{BA_i} \cdot \vec{OB})^2 - |\vec{BA_i}|^2(|\vec{OB}|^2 - R^2)}}{|\vec{BA_i}|^2}$$ (8)

FIGS. 11A and 11B are diagrams illustrating values of the solutions t1 and t2, and a positional relationship between the interfering station Ai, the interfered station B, and the Earth's surface. As illustrated in FIG. 11A, when 0≤t1≤1 and 0≤t2≤1, the line segment AiB has intersection points with the Earth's surface. On the other hand, as illustrated in FIG. 11B, when t1<0, 1<t1 or t2<0, 1<t2, the line segment AiB does not have an intersection point with the Earth's surface.

In step S315 in FIG. 4, the sight-line determination unit 104 determines that there is no sight-line on the AiB as illustrated in FIG. 11A when the solution t1 and the solution t2 are 0≤t1≤1 and 0≤t2≤1 (YES in step S315). The interference power estimation apparatus 1 does not perform interference calculation, and the repetition processing unit 102 performs the process in step S715 in FIG. 8 to be described below.

On the other hand, in step S315 in FIG. 4, the sight-line determination unit 104 determines that there is a sight-line on the AiB as the line segment AiB and the Earth's surface do not have an intersection point as illustrated in FIG. 11B when t1<0, 1<t1 or t2<0, 1<t2 (NO in step S315). The interference power estimation apparatus 1 performs the process in FIG. 5.

Figure 5:
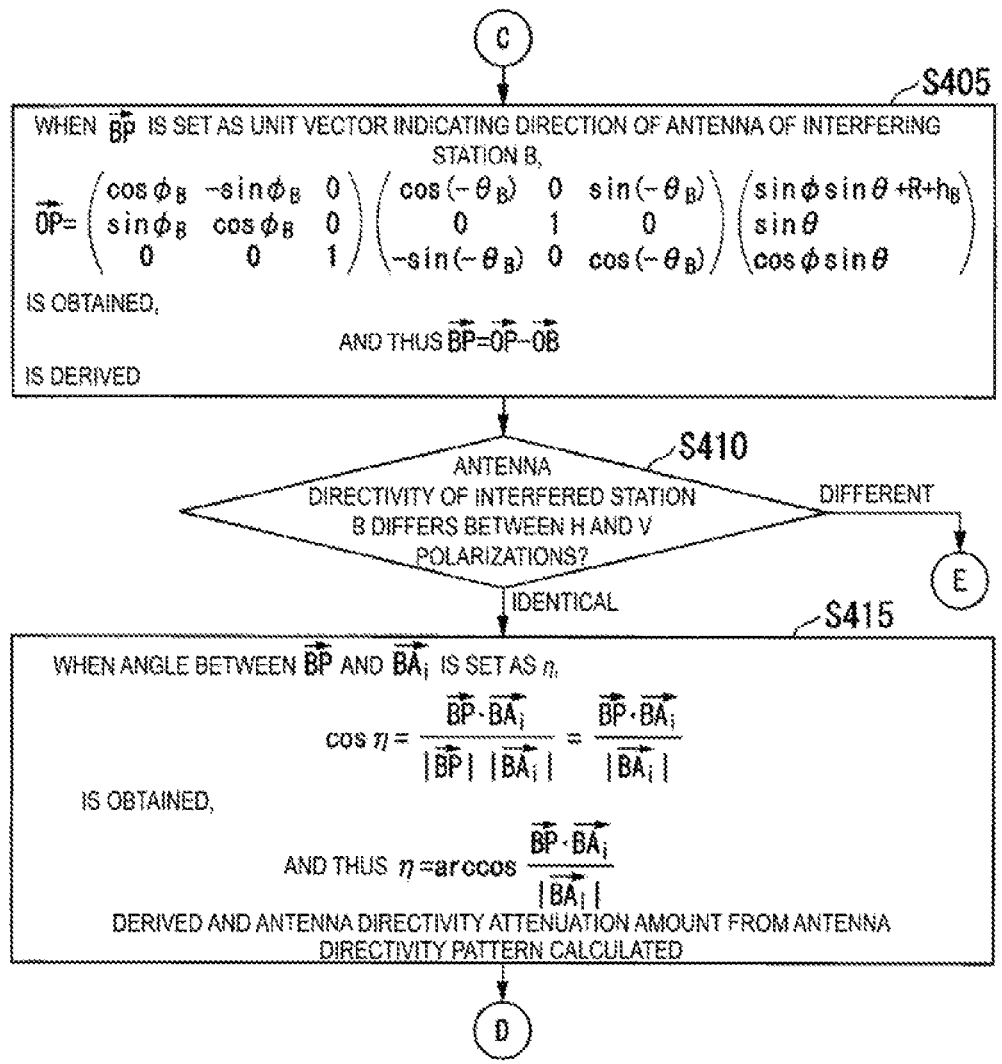
FIG. 5 is a diagram illustrating still another detailed flow of the interference power estimation process executed by the interference power estimation apparatus according to the same embodiment.

In FIG. 5, the antenna direction vector calculation unit 105 calculates the antenna direction vector (BP)→, which is a unit vector representing an antenna direction of the interfered station B (step S405). Specifically, first, the vector (OP)→ when the position of the interfered station B is a virtual position of the latitude θB=0 and the longitude φB=0 is considered.

FIG. 12 is a diagram illustrating a derivation method of the vector (OP)→ when the interfered station B is in a virtual position of the latitude θB=0 and the longitude φB=0. A unit vector from the center O of the Earth toward a positive z-axis direction is represented by the following formula (9).

[Formula 9]

$$\text{unit vector} = \begin{pmatrix} 0 \\ 0 \\ 1 \end{pmatrix}$$ (9)

In a case of the antenna azimuth θ and the antenna elevation angle φ of the interfered station B, when a unit vector represented by formula (9) is rotated by −φ around a center of the x-axis, rotated by φ around a center of the y-axis, and translated by R+hB in the positive x-axis direction, the (OP)→ when the interfered station B is in a virtual position of the latitude θB=0 and the longitude φB=0, is calculated by the following formula (10).

[Formula 10]

$$\vec{OP} = \begin{bmatrix} \cos\varphi & 0 & \sin\varphi \\ 0 & 1 & 0 \\ -\sin\varphi & 0 & \cos\varphi \end{bmatrix} \begin{bmatrix} 1 & 0 & 0 \\ 0 & \cos(-\theta) & -\sin(-\theta) \\ 0 & \sin(-\theta) & \cos(-\theta) \end{bmatrix} \begin{pmatrix} 0 \\ 0 \\ 1 \end{pmatrix} +$$

$$\begin{pmatrix} R+h_B \\ 0 \\ 0 \end{pmatrix} = \begin{pmatrix} \sin\varphi\cos\theta + R + h_B \\ \sin\theta \\ \cos\varphi\cos\theta \end{pmatrix}$$ (10)

Next, the vector (OP)→ in a case of unfixing the latitude θB and the longitude φB of the interfered station B is considered.

Figure 13:
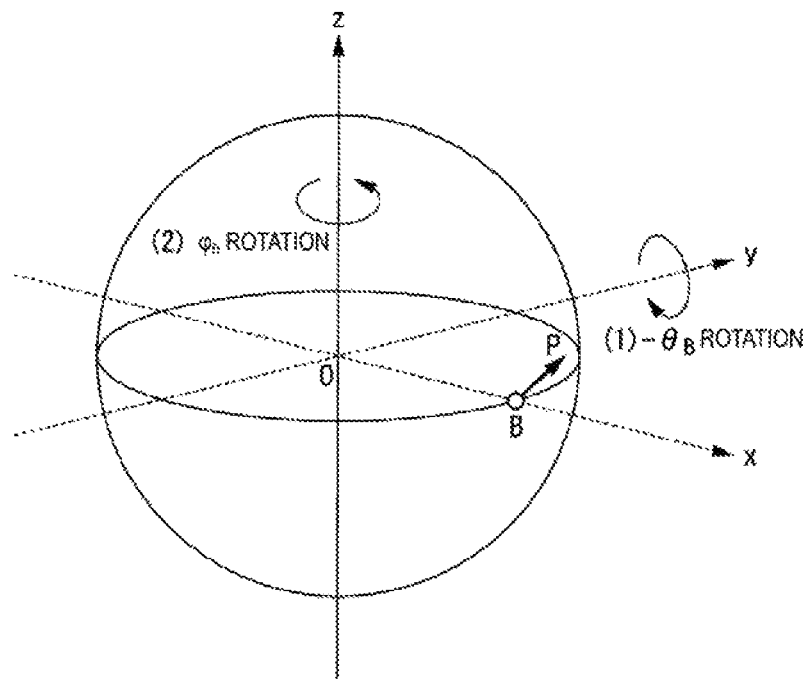
FIG. 13 is a diagram illustrating the derivation method of the antenna direction vector when the position of the interfered station B is latitude θB and longitude φB according to the same embodiment.

FIG. 13 is a diagram illustrating a derivation method of the vector (OP)→ in a case of unfixing the latitude θB and the longitude φB. For the vector (OP)→ obtained by the formula (10), the following formula (11) is obtained for the interfered station B, which is the general latitude θB and longitude φB when being rotated by −φB around a center of the y-axis and rotated by φB around a center of the z-axis

[Formula 11]

$$\vec{OP} = \begin{bmatrix} \cos\varphi_B & -\sin\varphi_B & 0 \\ \sin\varphi_B & \cos\varphi_B & 0 \\ 0 & 0 & 1 \end{bmatrix} \begin{bmatrix} \cos(-\theta_B) & 0 & \sin(-\theta_B) \\ 0 & 1 & 0 \\ -\sin(-\theta_B) & 0 & \cos(-\theta_B) \end{bmatrix}$$

$$\begin{pmatrix} \sin\varphi\cos\theta + R + h_B \\ \sin\theta \\ \cos\varphi\cos\theta \end{pmatrix}$$ (11)

The antenna direction vector calculation unit 105 obtains the antenna direction vector (BP)→ according to the following formula (12) by using the vector (OP)→ calculated by the formula (11).

[Formula 12]

$$\vec{BP} = \vec{OP} - \vec{OB}$$ (12)

Next, as illustrated in FIG. 5, the interfered station antenna directivity determination unit 106 refers to the antenna directivity pattern of the interfered station B input by the input unit 101, and determines whether antenna directivities of the interfered station B differs between the H polarization and the V polarization (step S410). In accordance with a determination that the antenna directivities of the interfered station B is identical in the H polarization and the V polarization (identical in step S410), the interfered station antenna directivity determination unit 106 takes over the process to the first angle deriving unit 107.

The first angle deriving unit 107 derives the angle η formed by the inter-station vector (BAi)→ and the antenna direction vector (BP)→, and calculates an antenna directivity attenuation amount corresponding to the angle θ from the antenna pattern of the interfered station B (step S415).

Figure 14:
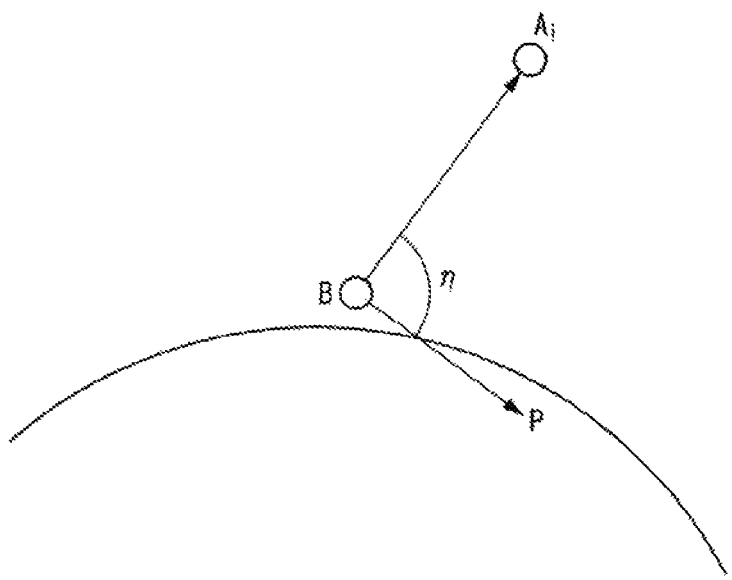
FIG. 14 is a diagram illustrating an angle η formed by an inter-station vector and the antenna direction vector according to the same embodiment.

FIG. 14 is a diagram illustrating the angle η. By definition of an inner product, the following formula (13) is obtained.

[Formula 13]

$$\vec{BA_i} \cdot \vec{BP} = |\vec{BA_i}||\vec{BP}|\cos\eta$$ (13)

The antenna direction vector (BP)→ is a unit vector, so that |(BP)→|=1 is obtained. Thus, the following formula (14) is obtained.

[Formula 14]

$$\cos \eta = \frac{\overrightarrow{BA_l} \cdot \overrightarrow{BP}}{|\overrightarrow{BA_l}|} \quad (14)$$

The angle η from formula (14) is obtained by the following formula (15):

[Formula 15]

$$\eta = \arccos \frac{\overrightarrow{BA_l} \cdot \overrightarrow{BP}}{|\overrightarrow{BA_l}|} \quad (15)$$

When the angle η is calculated by formula (15), the first angle deriving unit 107 calculates an antenna directivity attenuation amount corresponding to the angle η, with reference to the antenna directivity pattern of the interfered station B input in step S210. The interference power estimation apparatus 1 performs the processes in FIG. 8 to be described below.

On the other hand, in a case where it is determined that the antenna directivities of the interfered station B are different in the H and V polarizations (different in step S410), the interfered station antenna directivity determination unit 106 takes over the process to the direction decomposition unit 108.

Figure 15:
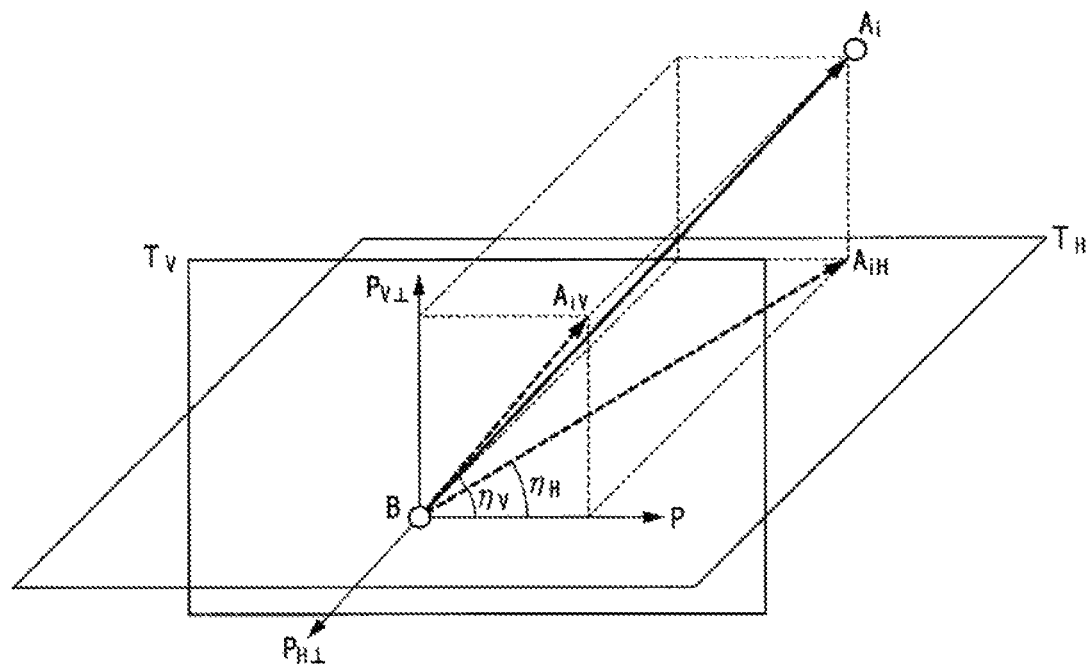
FIG. 15 is a diagram illustrating data required when the inter-station vector is decomposed into H and V direction components according to the same embodiment.
Figure 16:
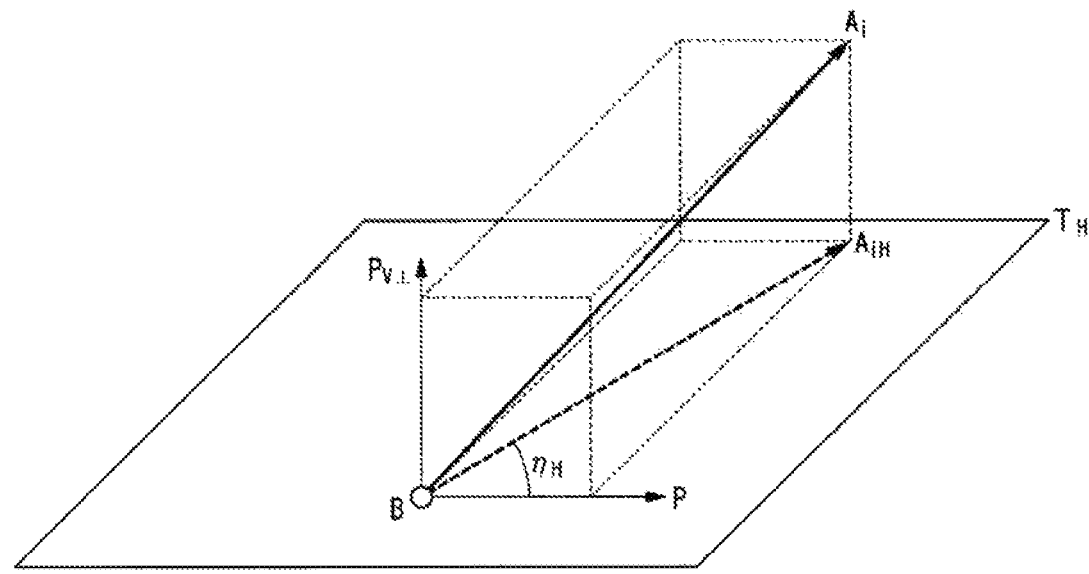
FIG. 16 is a diagram extracted from FIG. 15 in the H direction.
Figure 17:
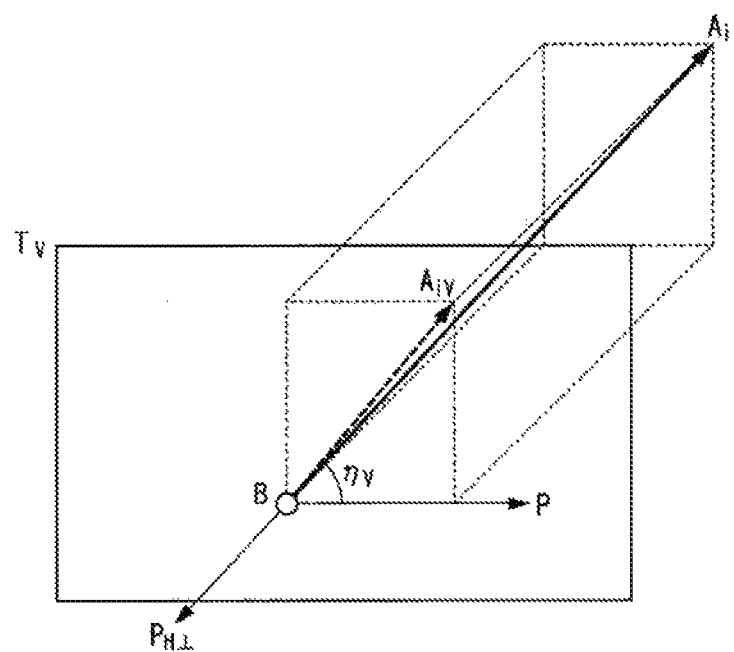
FIG. 17 is a diagram extracted from FIG. 15 in the V direction.

The direction decomposition unit 108 derives an inter-station vector V direction component (BAiV)→, which is an H direction component of the inter-station vector (BAi)→ and an inter-station vector V direction component (BAiV)→, which is a V direction component of the inter-station vector (BAi)→. FIG. 15 is a diagram illustrating data required when the inter-station vector (BAi)→ is decomposed into the inter-station vector H direction component (BAiH)→ and the inter-station vector V direction component (BAiV)→. FIG. 16 is a diagram extracted from a portion related to the direction H in FIG. 15, and FIG. 17 is a diagram extracted a portion related to the V direction in FIG. 15.

In FIG. 6, the direction decomposition unit 108 first defines a vector (BPH⊥)→ obtained by rotating the antenna direction vector (BP)→ by π/2 in the horizontal direction, and a vector (BPV⊥)→ obtained by rotating the antenna direction vector (BP)→ by π/2 in the vertical direction. Here, when a position vector (OPH⊥)→ of a point PH⊥ determined by the vector (BPH⊥)→ and a position vector (OPV⊥)→ of the point PV⊥ determined by the vector (BPV⊥)→ are considered as the formula 11 of the vector (OP)→, the following formulas (16) and (17) are obtained.

[Formula 16]

$$\overrightarrow{OP_{H\perp}} = \begin{bmatrix} \cos \varphi_B & -\sin \varphi_B & 0 \\ \sin \varphi_B & \cos \varphi_B & 0 \\ 0 & 0 & 1 \end{bmatrix} \begin{bmatrix} \cos(-\theta_B) & 0 & \sin(-\theta_B) \\ 0 & 1 & 0 \\ -\sin(-\theta_B) & 0 & \cos(-\theta_B) \end{bmatrix} \quad (16)$$

$$\begin{pmatrix} \sin \varphi \cos\left(\theta + \frac{\pi}{2}\right) + R + h_B \\ \sin\left(\theta + \frac{\pi}{2}\right) \\ \cos \varphi \cos\left(\theta + \frac{\pi}{2}\right) \end{pmatrix}$$

[Formula 17]

$$\overrightarrow{OP_{V\perp}} = \begin{bmatrix} \cos \varphi_B & -\sin \varphi_B & 0 \\ \sin \varphi_B & \cos \varphi_B & 0 \\ 0 & 0 & 1 \end{bmatrix} \begin{bmatrix} \cos(-\theta_B) & 0 & \sin(-\theta_B) \\ 0 & 1 & 0 \\ -\sin(-\theta_B) & 0 & \cos(-\theta_B) \end{bmatrix} \quad (17)$$

$$\begin{pmatrix} \sin\left(\varphi + \frac{\pi}{2}\right) \cos \theta + R + h_B \\ \sin \theta \\ \cos\left(\varphi + \frac{\pi}{2}\right) \cos \theta \end{pmatrix}$$

Based on the formulas (16) and (17) above, the direction decomposition unit 108 obtains the horizontal antenna direction vector (BPH⊥)→ and the vertical antenna direction vector (BPV⊥)→ by using the following formulas (18) and (19).

[Formula 18]

$$\overrightarrow{BP_{H\perp}} = \overrightarrow{OP_{H\perp}} - \overrightarrow{OB} \quad (18)$$

[Formula 19]

$$\overrightarrow{BP_{V\perp}} = \overrightarrow{OP_{V\perp}} - \overrightarrow{OB} \quad (19)$$

Next, the direction decomposition unit 108 sets a plane including the antenna direction vector (BP)→ and the horizontal antenna direction vector (BPH⊥)→ as a plane TH, and a plane including the antenna direction vector (BP)→ and the vertical antenna direction vector (BPV⊥)→ as a plane TV (FIG. 15 and FIG. 16).

Further, a point AiH is an intersection point when a perpendicular is drawn from a point Ai to the plane ΔH, and a point AiV is an intersection when a perpendicular is drawn from a point Ai to the plane ΔV (FIG. 15 and FIG. 17). At this time, the inter-station vector H direction component (BAiH)→ is represented by the following formula (20).

[Formula 20]

$$\overrightarrow{BA_{iH}} = \overrightarrow{BA_i} - \overrightarrow{A_{iH} A_i} \quad (20)$$

(AiHAi)→ is an orthogonal projection vector of the inter-station vector (BAi)→ for the vertical antenna direction vector (BPV⊥)→, so the following formula (21) is obtained.

[Formula 21]

$$\overrightarrow{A_{iH} A_i} = \left(\overrightarrow{BA_l} \cdot \frac{\overrightarrow{BP_{V\perp}}}{|\overrightarrow{BP_{V\perp}}|}\right) \frac{\overrightarrow{BP_{V\perp}}}{|\overrightarrow{BP_{V\perp}}|} = \left(\overrightarrow{BA_l} \cdot \overrightarrow{BP_{V\perp}}\right) \overrightarrow{BP_{V\perp}} \quad (21)$$

According to the formula (21) above, the inter-station vector H direction component $(\overrightarrow{BA_{iH}})$ is represented by the following formula (22).

[Formula 22]

$$\overrightarrow{BA_{iH}} = \overrightarrow{BA_i} - (\overrightarrow{BA_i} \cdot BP_{V\perp})BP_{V\perp} \quad (22)$$

In the same manner as the formula (20) above, the inter-station vector V direction component $(\overrightarrow{BA_{iV}})$ is represented by the following formula (23).

[Formula 23]

$$\overrightarrow{BA_{iV}} = \overrightarrow{BA_i} - \overrightarrow{A_{iV}A_i} \quad (23)$$

$(\overrightarrow{A_{iV}A_i})$ is an orthogonal projection vector of the inter-station vector $(\overrightarrow{BA_i})$ for the horizontal antenna direction vector $(\overrightarrow{BP_{H\perp}})$, so the following formula (24) is obtained.

[Formula 24]

$$\overrightarrow{A_{iV}A_i} = \left(\overrightarrow{BA_i} \cdot \frac{\overrightarrow{BP_{H\perp}}}{|\overrightarrow{BP_{H\perp}}|}\right)\frac{\overrightarrow{BP_{H\perp}}}{|\overrightarrow{BP_{H\perp}}|} = (\overrightarrow{BA_i} \cdot BP_{H\perp})BP_{H\perp} \quad (24)$$

According to the formula (24) above, the inter-station vector V direction component $(\overrightarrow{BA_{iV}})$ is represented by the following formula (25).

[Formula 25]

$$\overrightarrow{BA_{iV}} = \overrightarrow{BA_i} - (\overrightarrow{BA_i} \cdot BP_{H\perp})BP_{H\perp} \quad (25)$$

The direction decomposition unit 108 calculates the inter-station vector H direction component $(\overrightarrow{BA_{iH}})$ according to the formula (22), and calculates the inter-station vector V direction component $(\overrightarrow{BA_{iV}})$ according to the formula (25) (step S510).

Figure 7:
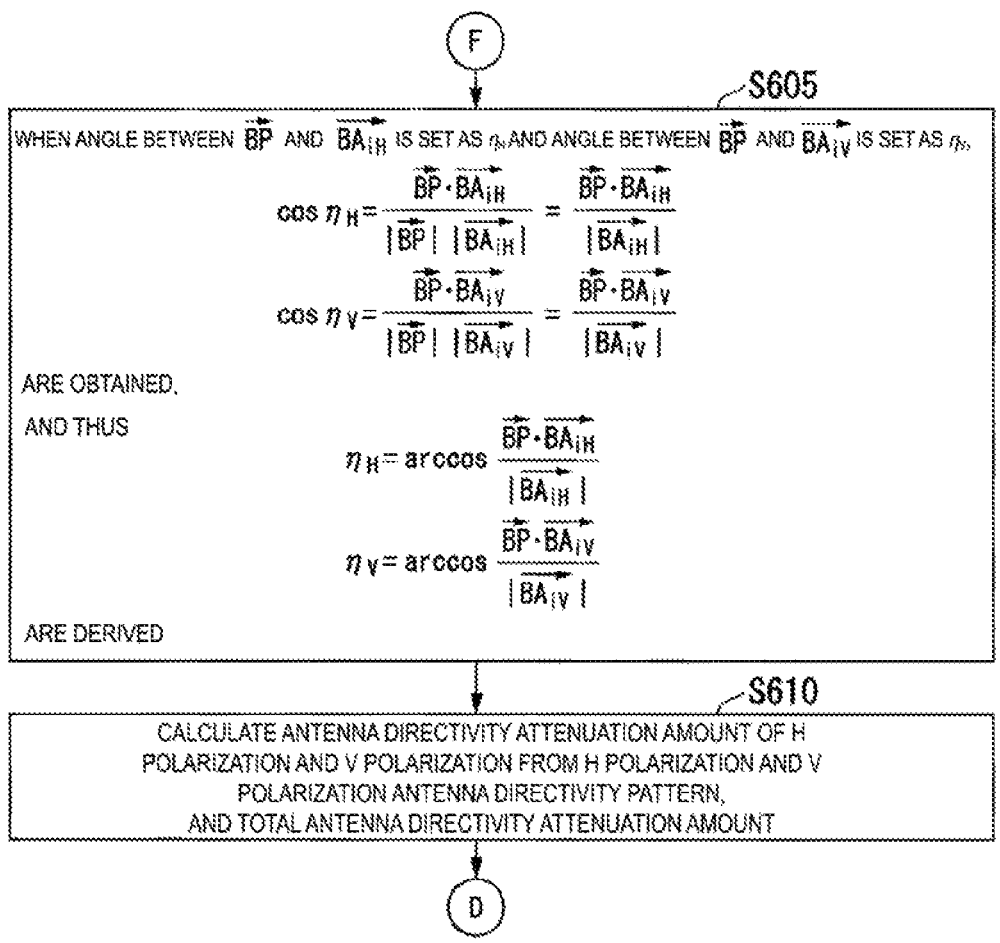
FIG. 7 is a diagram illustrating still another detailed flow of the interference power estimation process executed by the interference power estimation apparatus according to the same embodiment.

Next, in FIG. 7, the second angle deriving unit 109 derives an angle ηH formed by the inter-station vector H direction component $(\overrightarrow{BA_{iH}})$ and the antenna direction vector $(\overrightarrow{BP})$, and an angle ηV formed by the inter-station vector V direction component $(\overrightarrow{BA_{iV}})$ and the antenna direction vector $(\overrightarrow{BP})$. For the H direction component, the following formula (26) is obtained from definition of the inner product.

[Formula 26]

$$\overrightarrow{BA_{iH}} \cdot \overrightarrow{BP} = |\overrightarrow{BA_{iH}}||\overrightarrow{BP}|\cos \eta_H \quad (26)$$

The antenna direction vector $(\overrightarrow{BP})$ is a unit vector, so that $|(\overrightarrow{BP})|=1$ and the following formula (27) is obtained.

[Formula 27]

$$\cos \eta_H = \frac{\overrightarrow{BA_{iH}} \cdot \overrightarrow{BP}}{|\overrightarrow{BA_{iH}}|} \quad (27)$$

Thus, an angle of ηH is obtained according to the following formula (28).

[Formula 28]

$$\eta_H = \arccos\frac{\overrightarrow{BA_{iH}} \cdot \overrightarrow{BP}}{|\overrightarrow{BA_{iH}}|} \quad (28)$$

For the V direction component, the following formula (29) is obtained from definition of the inner product.

[Formula 29]

$$\overrightarrow{BA_{iV}} \cdot \overrightarrow{BP} = |\overrightarrow{BA_{iV}}||\overrightarrow{BP}|\cos \eta_V \quad (29)$$

The antenna direction vector $(\overrightarrow{BP})$ is a unit vector, so that $|(\overrightarrow{BP})|=1$ and the following formula (30) is obtained.

[Formula 30]

$$\cos \eta_V = \frac{\overrightarrow{BA_{iV}} \cdot \overrightarrow{BP}}{|\overrightarrow{BA_{iV}}|} \quad (30)$$

Thus, an angle of ηV is obtained according to the following formula (31).

[Formula 31]

$$\eta_V = \arccos\frac{\overrightarrow{BA_{iV}} \cdot \overrightarrow{BP}}{|\overrightarrow{BA_{iV}}|} \quad (31)$$

The second angle deriving unit 109 obtains an angle of the angle ηH according to the formula (28), and obtains an angle of the angle ηV according to the formula (31) (step S605).

Next, the second angle deriving unit 109 refers to an antenna directivity pattern of each of the H polarization and V polarization of the interfered station B input in step S210 to calculate the H polarization antenna directivity attenuation amount corresponding to the angle ηH, and the V polarization antenna directivity attenuation amount corresponding to the angle ηV. The second angle deriving unit 109 sums the calculated H polarization antenna directivity attenuation amount and the V polarization antenna directivity attenuation amount, and calculates a total antenna directivity attenuation amount (step S610). The interference power estimation apparatus 1 performs the processes in FIG. 8.

In FIG. 8, the sum calculation unit 110 calculates propagation losses based on a distance $|(\overrightarrow{BA_i})|$ between the interfering station Ai and the interfered station B (step S705). The propagation losses are calculated by the following formula (32), for example, if the propagation losses are free space propagation losses. Meanwhile, f is a frequency of a radio wave emitted by the interfering station Ai.

[Formula 32]

$$\text{propagation losses} = 32.4 + 20\log f + 20\log|\overrightarrow{BA_i}| \quad (32)$$

The sum calculation unit 110 adds the propagation losses obtained in step S705 and the antenna directivity attenuation amount calculated by the first angle deriving unit 107 in step S415 or the total antenna directivity attenuation amount calculated by the second angle deriving unit 109 in step S610, and calculates the sum Li of the propagation losses and the directivity attenuation amount (step S710).

In a case where it is determined that a value of the current i does not reach n, the repetition processing unit 102 controls the attenuation amount calculation process from step S220 in FIG. 3 to step S710 in FIG. 8 to be repeatedly executed, while adding one to the value of the current i. In a case where the number of repetitions of i reaches n, the repetition processing unit 102 notifies the minimum value calculation unit 111 of an end of the repetition of the attenuation amount calculation process (step S715).

The minimum value calculation unit 111 searches for a minimum value Lmin among the sum Li (i=1 to n) calculated for each of all of the interfering stations Ai in the attenuation amount calculation process by the formula (33) below (step S720).

[Formula 33]
$$L_{min} = \min_{i=1 \sim n} L_i \quad (33)$$

The interference power calculation unit 112 calculates the interference power Pr received by the interfered station B by using the information input by the input unit 101 and the value of the sum Li of the propagation losses and the directivity attenuation amount obtained by the minimum value calculation unit 111 in step S715 (step S725). For example, the interference power Pr is obtained by adding transmission power (or transmission power density), an antenna gain Gt, a loss Lt such as a power supply line of the interfering station Ai, an antenna gain Gr, a loss Tr such as a power supply line, and the like of the interfered station B, and the minimum value Lmin of the sum of the propagation losses and the directivity attenuation amount together, in a case where each numerical value is a "dB" unit. In addition, in the process of deriving the minimum value Lmin of the sum, the antenna direction and the antenna directivity pattern of the interfered station B is already considered. Thus, in a case where the calculated interference power Pr is compared with the allowable interference power and the interference power Pr is lower than the p allowable interference power, it can be determined that interference power from the satellite is acceptable.

In the interference power estimation apparatus 1 according to the present embodiment, for all positions at which the satellite may exist, a loss of radio waves is calculated based on both of propagation losses and directivity attenuation, so that it is possible to accurately calculate incoming interference power from a satellite to a ground station. In addition, the interference power estimation apparatus 1 can reduce the calculation amount by using a matrix operation to be described below for vector calculation necessary for calculation of the propagation losses and the directivity attenuation, and to easily calculate the incoming interference power from the satellite to the ground station. As described above, according to the present embodiment, it is possible to more accurately and easily calculate the interference power from the satellite to the ground station.

The function of the interference power estimation apparatus 1 according to the above-described embodiment may be realized by a computer. In this case, a program for realizing the functions may be recorded on a computer-readable recording medium, and the functions may be realized by reading the program recorded on the recording medium into a computer system and executing the program. The "computer system" here includes an OS or hardware such as a peripheral device. The "computer-readable recording medium" is, for example, a portable medium such as a flexible disk, a magneto-optical disk, a ROM, a CD-ROM or a storage device such as a hard disk embedded in the computer system. The "computer readable recording medium" may be a medium which dynamically holds programs for a short period, such as a communication line in a case of transmitting the program via a network such as the Internet or a communication line such as a telephone line or a medium which holds the program for a certain period, such as a volatile memory inside the computer system which becomes a server or a client in this case. Further, the program may be for realizing some of the functions described above, and may be realized by a combination of the above-described functions and the programs already recorded in the computer system.

According to the above-described embodiment, the interference power estimation apparatus includes the inter-station vector calculation unit, the determination unit (for example, the sight-line determination unit 104), the antenna direction vector calculation unit, the angle deriving unit (for example, the first angle deriving unit 107, the direction decomposition unit 108, and the second angle deriving unit 109), the sum calculation unit, the process control unit (for example, the repetition processing unit 102), a minimum value calculation unit, and an interference power calculation unit. The inter-station vector calculation unit calculates an inter-station vector from an interfered station to an interfering station, based on interfering station position information representing a position of the interfering station over a sphere and interfered station position information representing a position of the interfered station installed on the sphere. The determination unit determines whether a line segment connecting the position of the interfered station and the position of the interfering station intersects with the sphere. In accordance with a determination of the determination unit that there is an intersection, the antenna direction vector calculation unit calculates an antenna direction vector representing an antenna direction from the position of the interfered station, based on antenna direction information representing the antenna direction of the interfered station and the interfered station position information. The angle deriving unit derives an angle between the antenna direction vector and the inter-station vector. The sum calculation unit calculates a sum of an antenna directivity attenuation amount obtained based on the derived angle and propagation losses calculated based on a distance between the interfered station and the interfering station. The process control unit controls to perform processes of the inter-station vector calculation unit, the determination unit, the antenna direction vector calculation unit, and the sum calculation unit, on each piece of information of a plurality of possible positions of the interfering station, and not to perform, in accordance with a determination that the line segment corresponding to the position of the interfering station intersects, calculation of the sum by processes of the antenna direction vector calculation unit and the sum calculation unit on the position of the interfering station. The minimum value calculation unit calculates a minimum value of the sum calculated for each piece of the information of the plurality of possible positions of the interfering station. The interference power calculation unit calculates interference power from the interfering station based on the minimum value of the sum.

In a case where an antenna directivity of the interfered station differs between the horizontal direction and the vertical direction, the angle deriving unit decomposes the inter-station vector into a horizontal component and a vertical component. The angle deriving unit sums the antenna directivity attenuation amount obtained from an angle between the horizontal component and the antenna direction vector and an antenna directivity of horizontal polarization of the interfered station, and the antenna directivity attenuation amount obtained from an angle between the vertical component and the antenna direction vector and an antenna directivity of vertical polarization of the interfered station. The sum calculation unit calculates the sum of the total antenna directivity attenuation and the propagation losses calculated based on a distance between the interfered station and the interfering station.

The antenna direction vector calculation unit sets a virtual position of the interfered station to a position at which latitude and longitude are 0° out of latitude, longitude, and altitude indicated by the interfered station position information. By using a matrix operation in which a unit vector which has a starting point at a center of a sphere and which is perpendicular to a direction from the center to the virtual position is rotated in accordance with an antenna azimuth and an antenna elevation angle obtained from the antenna direction information, and then is translated from the center of the sphere to the virtual position, and is further rotated in accordance with the latitude and the longitude indicated by the interfered station position information, the antenna direction vector calculation unit calculates an antenna direction vector.

The embodiments of the present disclosure are described in detail above with reference to the drawings, but the specific configuration is not limited to this embodiment, and includes a design or the like within a range not departing from the gist of the present disclosure.

REFERENCE SIGNS LIST 1 interference power estimation apparatus
101 input unit
102 repetition processing unit
103 Inter-station vector calculation unit
104 sight-line determination unit
105 antenna direction vector calculation unit
106 interfered station antenna directivity determination unit
107 first angle deriving unit
108 direction decomposition unit
109 second angle deriving unit
110 sum calculation unit
111 minimum value calculation unit
112 interference power calculation unit

The invention claimed is:

1. An interference power estimation method comprising: calculating an inter-station vector which is a vector from an interfered station to an interfering station, based on interfering station position information representing a position of the interfering station over a sphere and interfered station position information representing a position of the interfered station installed on the sphere; determining whether a line segment connecting the position of the interfered station and the position of the interfering station intersects with the sphere; calculating, in accordance with a determination of the determining that there is no intersection, an antenna direction vector which is a vector representing a direction of an antenna from the position of the interfered station, based on antenna direction information representing the direction of the antenna of the interfered station and the interfered station position information; deriving an angle between the antenna direction vector and the inter-station vector; calculating a sum of an antenna directivity attenuation amount obtained based on the angle and propagation losses calculated based on a distance between the interfered station and the interfering station; controlling to perform the calculating of the inter-station vector, the determining whether a line segment connecting the position of the interfered station and the position of the interfering station intersects with the sphere, the calculating of the antenna direction vector, and the calculating of the sum of the antenna directivity attenuation amount obtained based on the angle and propagation losses on each piece of information of a plurality of possible positions of the interfering station, and not to perform, in accordance with a determination of the determining that the line segment corresponding to the position of the interfering station intersects, the calculating of the antenna direction vector and the calculating of the sum of the antenna directivity attenuation amount obtained based on the angle and propagation losses, on the position of the interfering station; calculating a minimum value of the sum calculated for each piece of the information of the plurality of possible positions of the interfering station; and calculating interference power from the interfering station based on the minimum value of the sum.

2. The interference power estimation method according to claim 1,
wherein the deriving of the angle includes, in a case where antenna directivity of the interfered station differs between a horizontal direction and a vertical direction, decomposing the inter-station vector into a horizontal component and a vertical component, and an antenna directivity attenuation amount obtained based on an angle between the horizontal component and summing the antenna direction vector and an antenna directivity attenuation amount obtained based on an angle between the vertical component and the antenna direction vector, and
the calculating of the sum of the antenna directivity attenuation amount and the propagation losses includes calculating a sum of the total antenna directivity attenuation amount and the propagation losses.

3. The interference power estimation method according to claim 1,
wherein the calculating of the antenna direction vector includes setting a virtual position of the interfered station to a position at which latitude and longitude are 0° out of latitude, longitude, and altitude indicated by the interfered station position information, and
calculating the antenna direction vector by using a matrix operation which includes rotating a unit vector which has a starting point at a center of the sphere and which is perpendicular to a direction from the center to the virtual position in accordance with an antenna azimuth and an antenna elevation angle obtained from the antenna direction information, and then translating the unit vector rotated from the center to the virtual position, and further includes rotating the unit vector rotated and then translated in accordance with the latitude and the longitude indicated by the interfered station position information.

4. An interference power estimation apparatus comprising:
a processor; and
a storage medium having computer programs instructions stored thereon, that are executed by the processor to perform:

calculating an inter-station vector which is a vector from an interfered station to an interfering station, based on interfering station position information representing a position of the interfering station over a sphere and interfered station position information representing a position of the interfered station installed on the sphere;

determining whether a line segment connecting the position of the interfered station and the position of the interfering station intersects with the sphere;

calculating, in accordance with a determination that there is no intersection, an antenna direction vector which is a vector representing a direction of an antenna from the position of the interfered station, based on antenna direction information representing the direction of the antenna of the interfered station and the interfered station position information;

deriving an angle between the antenna direction vector and the inter-station vector;

calculating a sum of an antenna directivity attenuation amount obtained based on the angle and propagation losses calculated based on a distance between the interfered station and the interfering station;

the calculation of the inter-station vector, the determination of whether a line segment connecting the position of the interfered station and the position of the interfering station intersects with the sphere, the calculation of the antenna direction vector, and the calculation of the sum of the antenna directivity attenuation amount obtained based on the angle and the propagation losses on each piece of information of a plurality of possible positions of the interfering station, and not to perform, in accordance with a determination of the determining that the line segment corresponding to the position of the interfering station intersects, the calculating of the antenna direction vector and the calculating of the sum of the antenna directivity attenuation amount obtained based on the angle and propagation losses, on the position of the interfering station;

calculating a minimum value of the sum calculated for each piece of the information of the plurality of possible positions of the interfering station; and calculating interference power from the interfering station based on the minimum value of the sum.

5. A non-transitory computer-readable medium having computer executable instructions that, upon execution of the instructions by a processor, cause the interference power estimation apparatus to function according to claim 4.

* * * * *